Oct. 8, 1957 E. NYYSSONEN 2,808,649
RANGE COMPUTING APPARATUS FOR GNOMONIC MAPS
Filed July 16, 1953 5 Sheets-Sheet 2

INVENTOR.
EINARD NYYSSONEN.
BY *Fred Koontz*
*Charles H. Wagner* AND
ATTORNEYS.

Oct. 8, 1957  E. NYYSSONEN  2,808,649
RANGE COMPUTING APPARATUS FOR GNOMONIC MAPS
Filed July 16, 1953  5 Sheets-Sheet 3
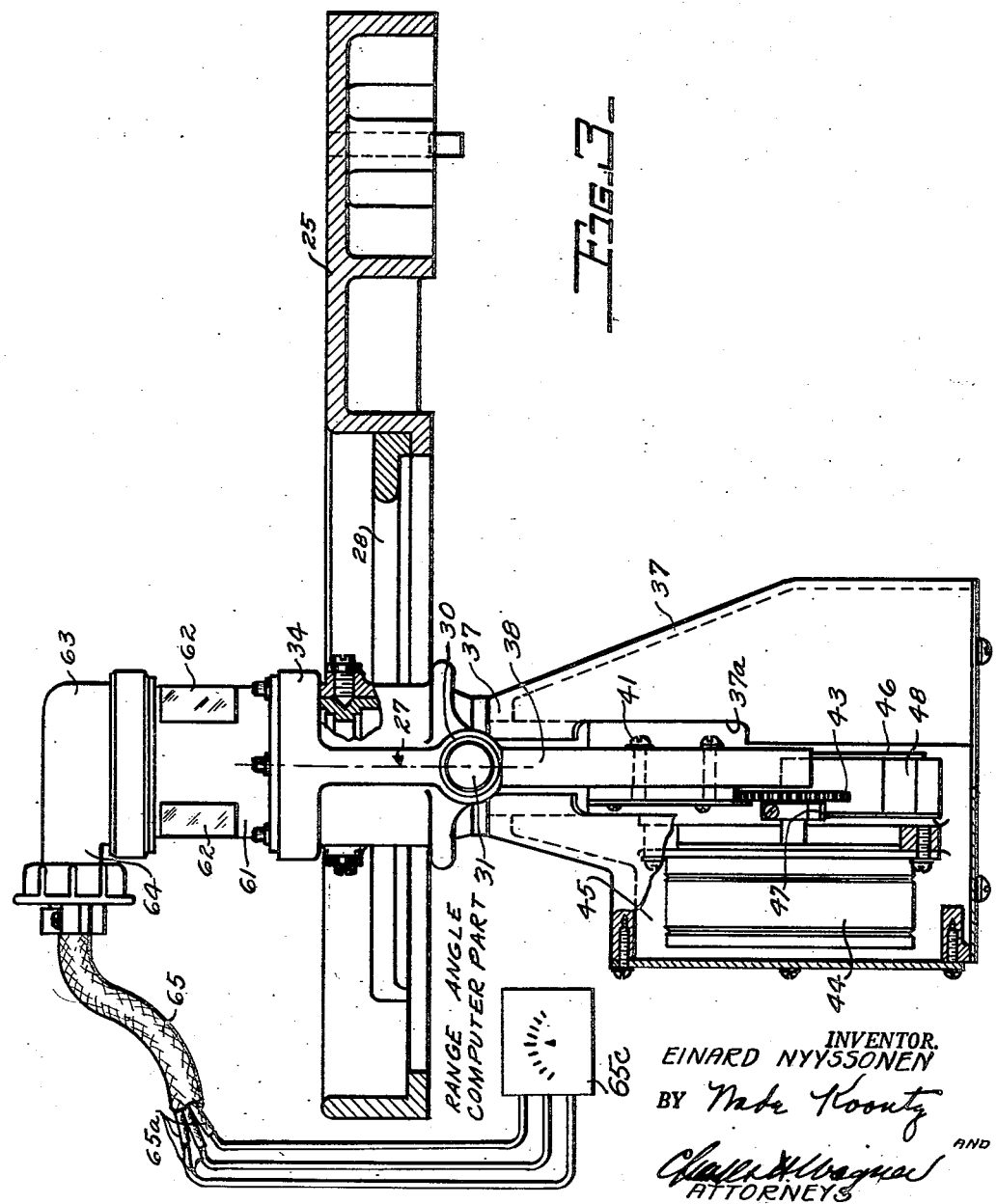

Oct. 8, 1957 E. NYYSSONEN 2,808,649
RANGE COMPUTING APPARATUS FOR GNOMONIC MAPS
Filed July 16, 1953 5 Sheets-Sheet 4
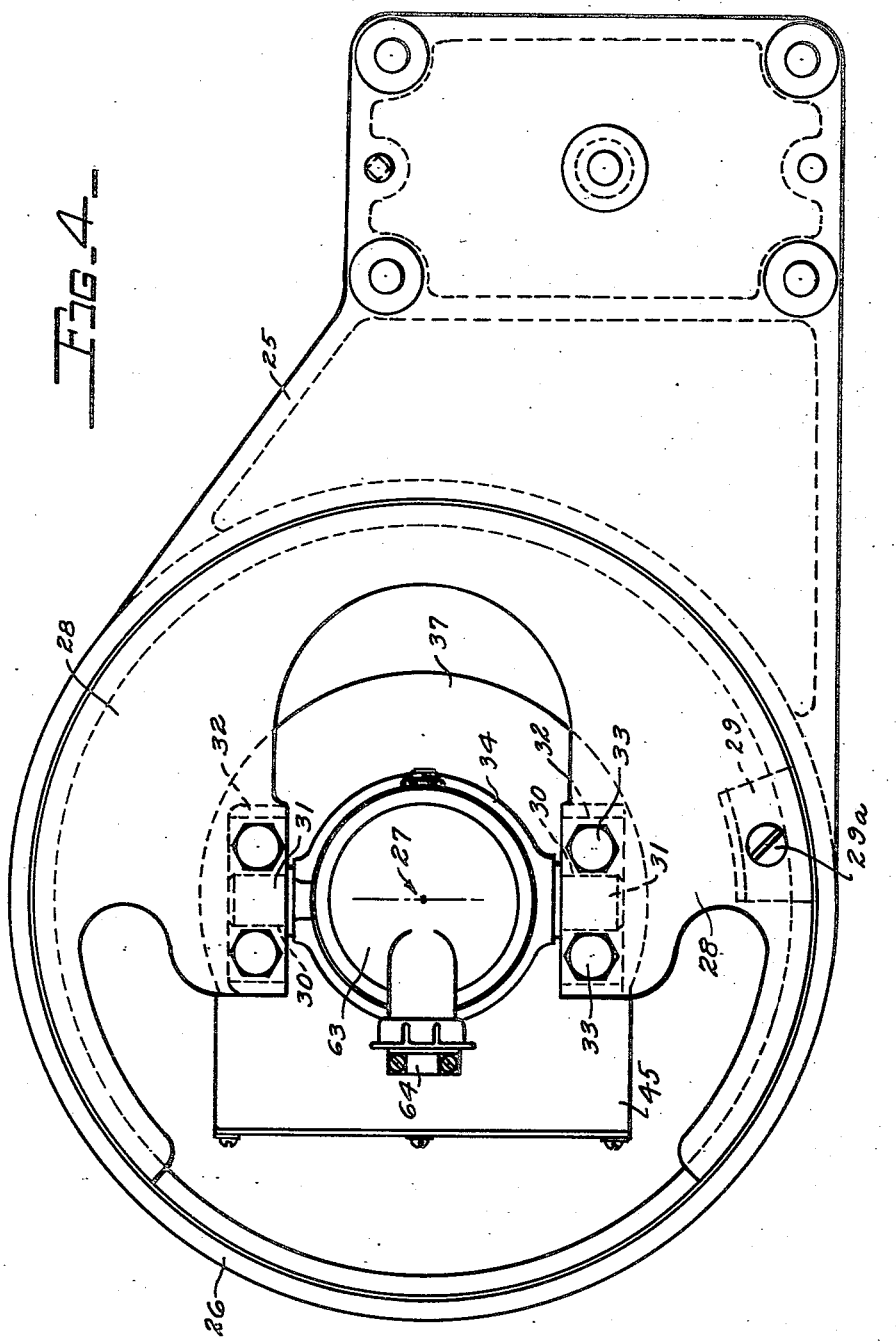
INVENTOR.
EINARD NYYSSONEN
BY
AND
ATTORNEYS

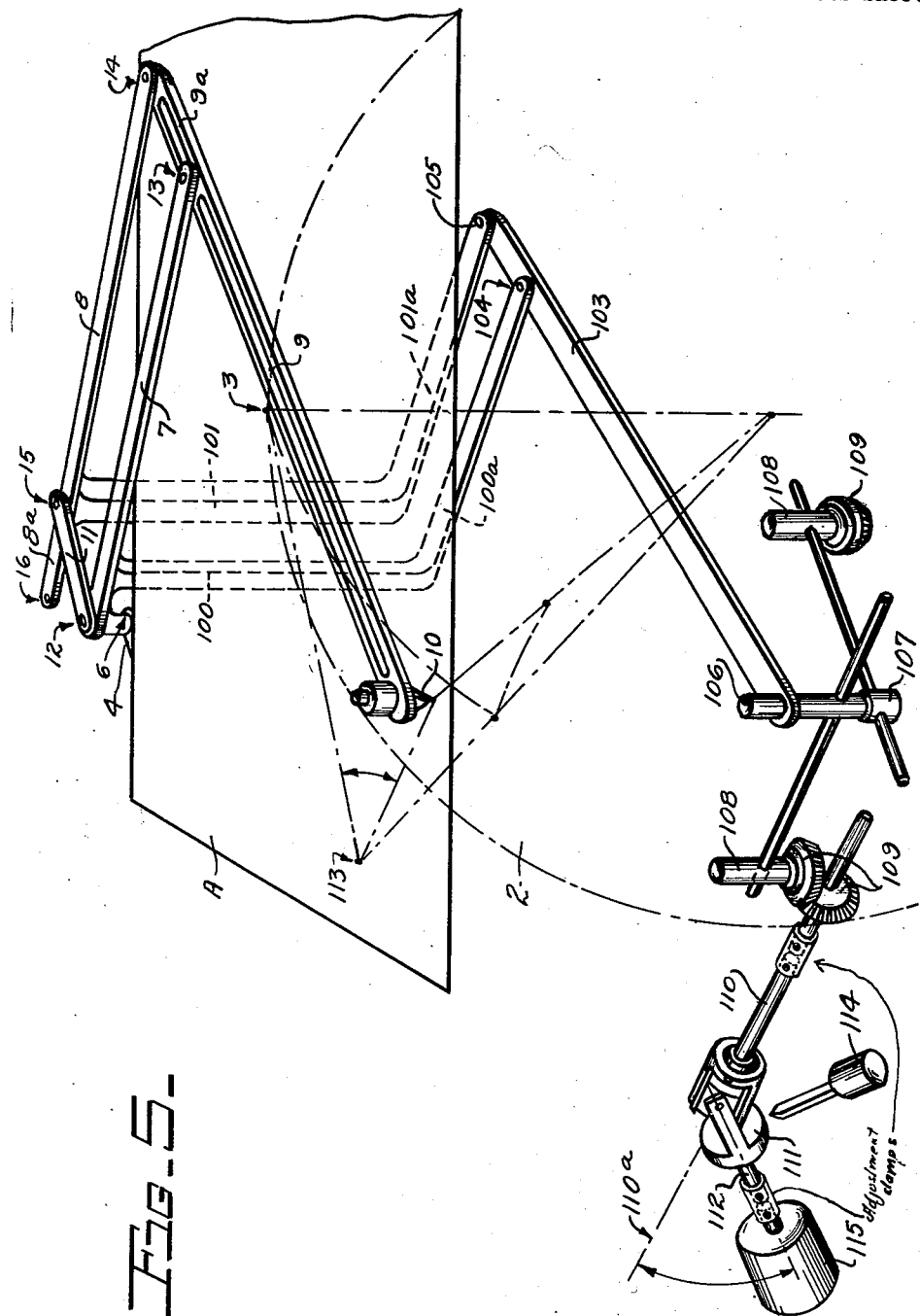

United States Patent Office 2,808,649
Patented Oct. 8, 1957

2,808,649

RANGE COMPUTING APPARATUS FOR GNOMONIC MAPS

Einard Nyyssonen, Watertown, Mass., assignor to the United States of America as represented by the Secretary of the Air Force Application July 16, 1953, Serial No. 368,459

7 Claims. (Cl. 33—1)

This invention relates to mapping and charting apparatus generally, and more particularly to a plotting board and cooperating means for accurately determining range or "great circle" distance on a gnomonic map or chart between any two selected points or locations on the map.

In carrying out the invention, the actual bearings, latitudes and longitude, of the selected point or points to be located with respect to some other fixed point are furnished or are otherwise determined and the position located on the gnomonic map, the azimuth angle or bearing being set up in the apparatus as indicating the true azimuth angle between the great circle arc or reference line from the plotting station to the represented true north of the gnomonic map and a second great circle arc or reference line from the plotting station to the point or location to be determined on the gnomonic chart. This invention is not primarily concerned with the apparatus for determining this azimuth angle or bearing and reference is made thereto as briefly as possible.

The invention relates primarily to the means for determining actual distance between any two selected points on a gnomonic chart, one of these points being indicated as any selected relatively fixed point or "plotting central" and the range being the distance therefrom to the other selected point.

Gnomonic charts are primarily used in plotting because only with this type of chart or map does the earth's great circles appear as straight lines and its spherical angles as plane angles. However, any flat representation of the spherical surface of the earch, such as a gnomonic map, is necessarily distorted and any angles, or distances, on the chart must be corrected for the distortion.

Gnomonic charts are drawn by projecting from a sphere, by means of radial lines from the center of the sphere to a plane tangent to the projecting sphere, a representation of the earth's surface. The scale of the gnomonic chart or map is determined by the ratio of the diameter of the projecting (map) sphere or globe with respect to the diameter of the earth. With this type of projection, angles or bearings on a gnomonic map are equal to true angles or bearings only at the point of tangency. Range or great circle distances on the gnomonic chart, on the other hand, is never true distance or range.

Range from any fixed selected point on the gnomonic map, usually termed the "plotting central," to any other selected point on the gnomonic map, usually termed herein as the "scanning point," can be accurately determined by my improved apparatus. The location of the plotting central on the gnomonic map and its imaginary point on the projecting (map) sphere which represents the earch are radially aligned, also the imaginary point of tangency between the gnomonic map and sphere are radially aligned, with respect to the center of the sphere. The scanning point on the gnomonic map represents any other selected point to which the range from the plotting central is to be determined. This scanning point is also aligned with a corresponding (scanning) point on the map projecting sphere and the center of the sphere. The range problem is solved by either computing the length of this arc on the sphere, or by computing the angle subtended at the center of the imaginary projecting sphere and then converting to linear distance, since, in the nautical system, one minute or arc represents one nautical mile. This range angle is computed by my improved apparatus directly from the surface of a gnomonic map. The radial lines which connect the locations of the plotting central and the scanning point with the center of the projecting sphere are imaginary, and my improved apparatus reproduces these lines mechanically, also the angle is measured electrically and converted to range distance.

In carrying out the invention a plotting board is employed to support the selected gnomonic map, and my apparaus includes a pantograph device. The location of the "scanning point" on the gnomonic map on the plotting board is reproduced by means of the pantograph from bearing direction data and apparatus, and is represented by the center of a universal joint with one shaft thereof positioned with its axis extending through the center of the imaginary sphere, the location of the plotting central is reproduced by an adjustable and rotatable housing oriented so that its axis extends through the imaginary position of the plotting central and the center of the imaginary sphere and the angular relation between the respective axes is a function of the angular or great circle distance from the plotting central on the gnomonic map to the scanning point.

Other objects and advantages of the invention will become apparent from the following description and accompanying drawings in which like reference characters refer to like parts in the several figures of the drawings.

Drawings

Fig. 3 is a side elevation of the range computer assembly shown in Fig. 2, but taken at right angles to Fig. 2, parts thereof being broken away and shown in section.

Fig. 4 is a top plan view of the parts shown in Fig. 2.

Fig. 5 is a schematic perspective view illustrating the pantograph arrangement which is located below the surface of the gnomonic map support or table for determining the azimuth angles or bearing directions of points or locations, around any point on the gnomonic map, such as the "plotting central."

Specification

Figure 1:
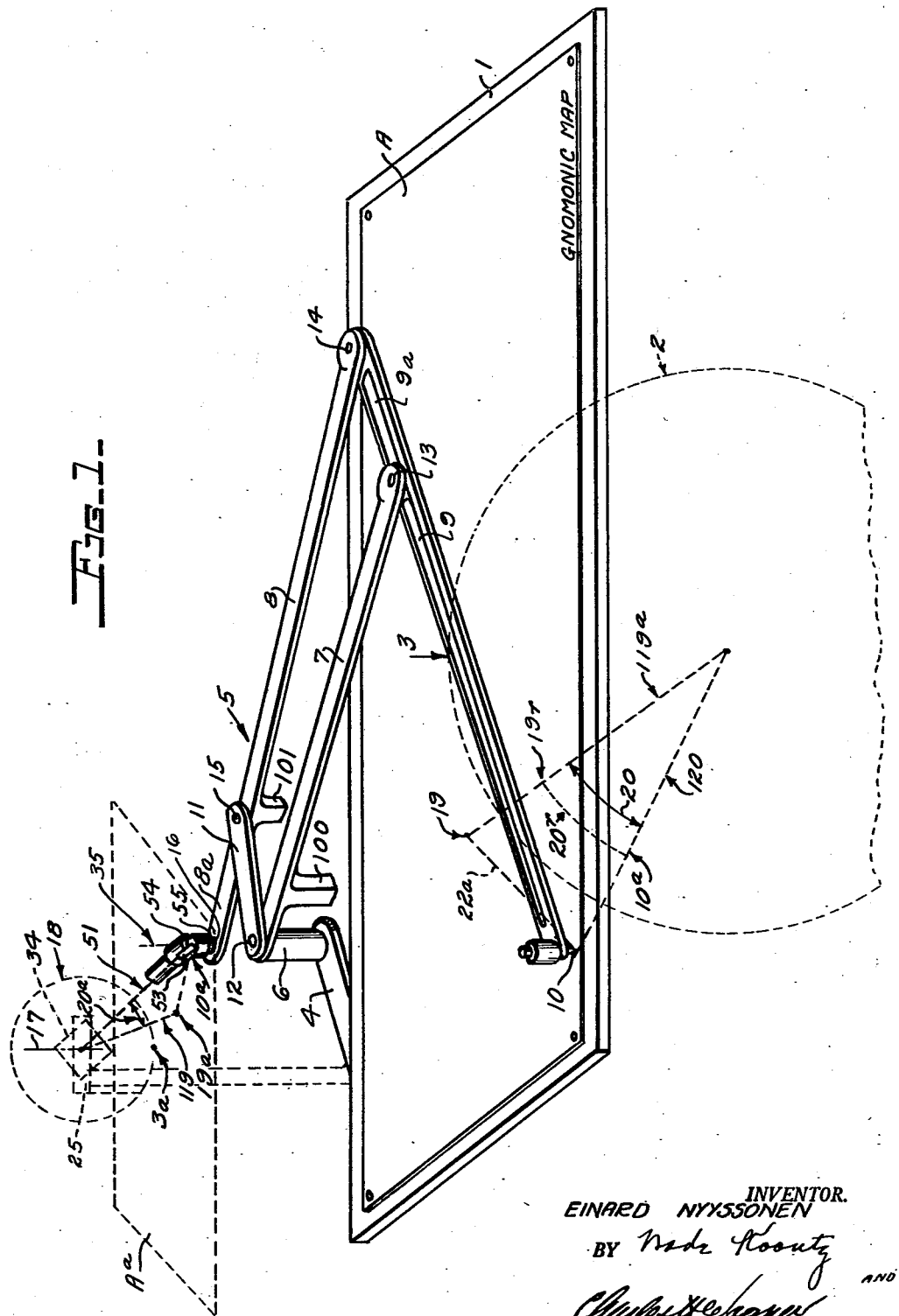
Fig. 1 is a schematic perspective view, illustrating the general method and apparatus employed in my improved range plotting board.

Referring to Fig. 1 of the drawings a gnomonic map is indicated schematically by the reference numeral A, and shown mounted on a suitable plane support, or map mounting board, or table 1. The imaginary map projection globe or sphere is indicated at 2, in dotted lines, having a conventional point of tangency to the plane of the gnomonic map surface at some point 3, usually however, at the center of the gnomonic map A.

The table 1 carries a pantograph supporting bracket 4 fixed thereto, upon which a pantograph 5 is mounted, pivoted at 6. The pantograph comprises the usual pivoted parallelogram frame comprising the long parallel bars or arms 7 and 8 and the scanning arm or bar 9 extending above the top of the table 1, having a scanning point 10 at its free end, the parallel link or short arm 11 forming the parallelogram frame, pivoted together at points 12, 13, 14 and 15, as shown in the drawing. The "reproducing" point of the pantograph 5 is indicated at 16; and while the "reproduction" may be of any desired proportions I preferably make the length of the scanning arm 9 between the scanning point 10 and pivot 13 equal to six times the length of the arm portion 8a from the pivot 15 to the reproducing point 16. The length of arm 11 between the pivots 12 and 15 and length on arm portion 9a between pivots 13 and 14 is similar, or one sixth the distance on arm 9 from pivot 13 to scanning point 10. This provides a 6 to 1 proportional movement between the scanning point 10 and the reproducing point 16.

Also fixedly mounted on the table 1 rearwardly thereof is my range computer assembly, shown in detail and described in connection with Figs. 2, 3 and 4. Its location in Fig. 1 is very schematically indicated at 17 with its universally pivoted tilting center representing the center of a second or smaller imaginary sphere or globe 18 shown in dotted lines having, in the present instance, a diameter one sixth that of the larger gnomonic projection sphere or globe 2 from which the gnomonic map was made, also dotted. The point of tangency 3 and scanning point are, of course, reproduced by the range computer pantograph reproducing arm at 3a and 10a respectively relative to an imaginary smaller (gnomonic) chart Aa shown in dotted lines, one sixth the size of the physical gnomonic chart A on the table 1.

Since the "plotting central" or point from which the plotting is made is usually at some definite location on the gnomonic map A, such as any point 19, hardly ever at the point of tangency 3, this point is also reproduced at 19a on the smaller imaginary gnomonic map Aa by the tilting of the axis of the assembly, relative to the point of tangency 3a so that its axis passes through center of imaginary small globe 18. This point of tangency 3a may be also initially located by the pantograph reproducing arm scanning point 10, as will be later explained, for initially setting the device for measuring any range such as indicated at 20, and the corresponding great circle distance, from the "plotting central" 19 to the adjusted position of the scanning point 10 at the selected point or location on the gnomonic map A and measuring also the range angle 20a with reference to the small imaginary sphere 18, representing distance from 19a to 10a on the smaller imaginary map Aa. Referring to Fig. 1 the distorted gnomonic map range or distance between the plotting central 19 and any selected scanning point 10 is indicated at 22a, while the true range distance on the surface of the imaginary map sphere 2 between similar points 19r and 10a is indicated by 20r.

The range computer assembly supporting bracket is fixed on the map supporting table 1, as previously indicated. This bracket is indicated in Figs. 2, 3 and 4 by the reference numeral 25 and is formed with an annular supporting flange 26 having a center at 27. An adjustable support or plate 28 of generally U shape rests on the flange 26, is rotatably adjustable about the center 27, and clamped in any adjusted position by the retainer plate 29 and screws 29a. The adjustment plate 28 is formed with depending trunnion bearings 30 having aligned axes passing through the center 27 below the plate 28 as shown.

The main housing 34 of the range computer assembly is tiltably hung on trunnions 31 journalled in the bearings 30, and bearing caps 32 provided may be tightened by the cap screws 33 to retain the main or central housing 34 with its axis 35 in any adjusted inclination, in one plane. Rotatory adjustment of the supporting plate 28 provides means for adjusting the inclination of the central housing axis 35 in a second intersecting plane, the purpose of which will later appear.

Figure 2:
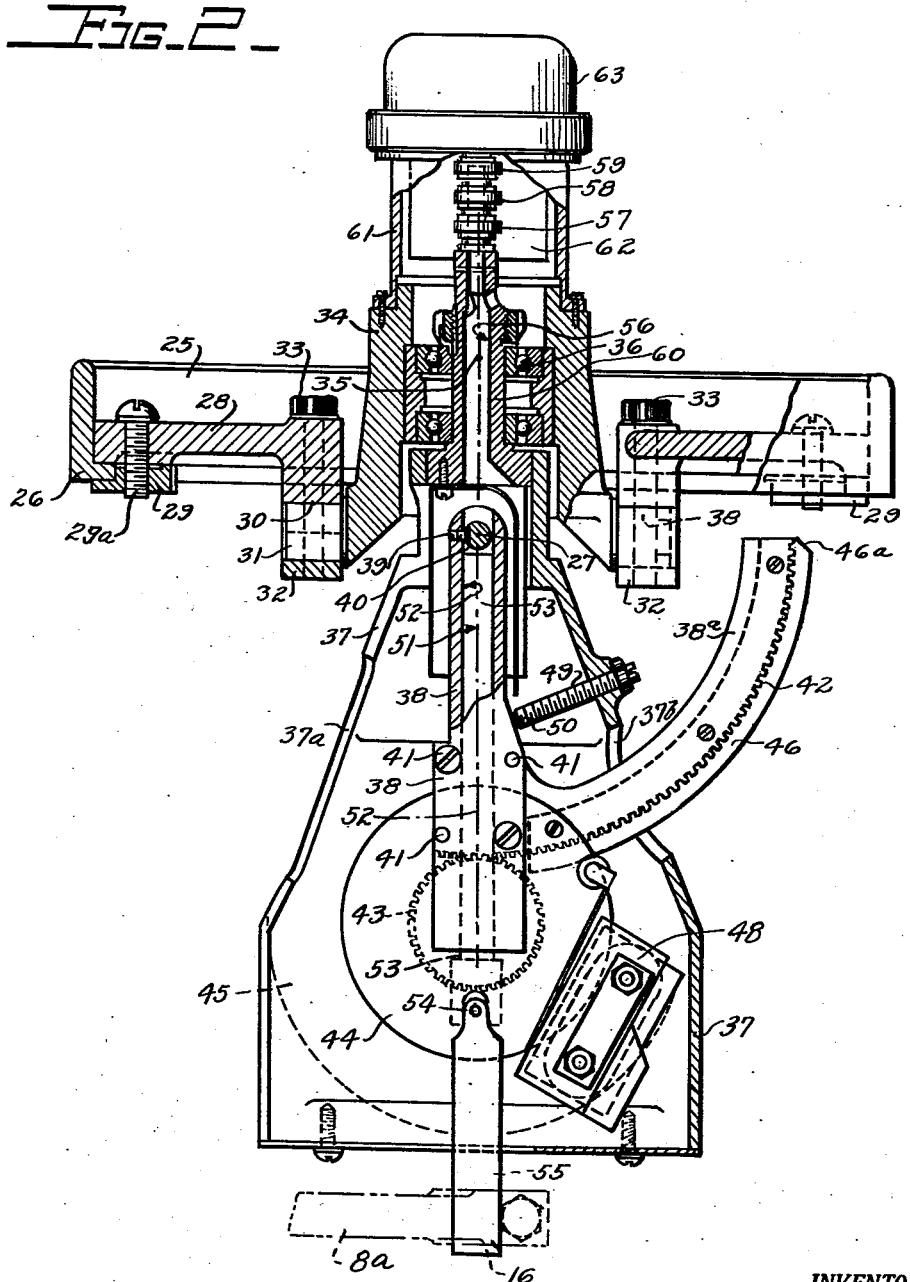
Fig. 2 is an enlarged vertical sectional view taken through the computer assembly in zero adjustment, or adjusted for determining range or distance from the "point of tangency" of the gnomonic map to the scanning point with respect to its imaginary spherical map.

Annular bearings 36, fixed within the central housing 34 as shown in Fig. 2, rotatably carry a bell-shaped potentiometer support means or housing 37 having spaced trunnion bearings therein with aligned axes disposed perpendicular to the axes 35 in a plane parallel to the rotative plane of the plate 28, intersecting the axes of the trunnion bearings 30 at the center 27. A tubular sector arm structure 38 is fixed by a set screw 39 on a short shaft 40 having its ends journalled in the trunnion bearings of the tubular rotatably adjustable bell-shaped housing 37. The bell-shaped housing 37 is therefore free to rotate on the bearings 36, and the sector arm structure 38 is free to tilt about the axis of the shaft 40.

Therefore the sector arm 38 is adjustable to any angle less than about 90° in any plane passing through the axis 35 of the central housing 34, regardless of the angular and rotative adjustment of the housing 34 on the trunnions 31 and supporting flange 26. The bell housing 37 is slotted at its front side as indicated at 37a, permitting the sector arm 38 to pass therethrough incident to its adjustment, an opening 37b being provided at its opposite side to accommodate the curved actuating or geared segment arm 38a projecting from the sector member 38 and fixed to the member 38 by fastenings 41 for setting the potentiometer.

A gear-tooth rack 42, formed on the curved arm 38a, meshes with a pinion gear 43 for adjusting the position of a slider of a potentiometer 44 fixed in the side enlargement 45 of the bell shape housing 37 and having a substantially linear electrical output. A side plate 46 on the arm 38a projects over the side of the slider adjusting pinion 43 retaining it in meshing rotation with the rack 42 and for controlling the actuation of a limit microswitch 48 to interrupt the electrical circuit to the electrical range angle indicator at a predetermined angular movement of the arm 38a. Adjustment of the potentiometer slider to zero position relative to the meshing position of gear 43 can be accomplished by adjusting the potentiometer body relative to the potentiometer shaft and pinion, for which purpose elongated slots are provided in the mounting flange of the potentiometer. The periphery of the thin side plate 46 has a cam portion for operating the micro-switch 48 to prevent an improper range indication when the sector arm member 38 swings too far, for instance, to the left, as shown in Fig. 2, the cut away end 46a or cam portion permits actuation of the micro switch control element.

The bell shape housing 37 is provided with an adjustable stop or set screw 49 engageable with the sector arm 38 at 50, whereby the initial predetemined aligned or "zero" position of the sector arm axis 51 with the axis 35 of housing 34 can be easily determined.

The sector member or arm 38 is formed with a cylindrical guide bore 52 having its center on the axis 51 and a shaft 53 is slidably journalled in the bore 52 having a universal actuating connection in the form of a universal joint therein at 54, the other end 55 of the shaft being fixed in reproducing end 8a of the pantograph arm 8 at 16 perpendicular to the gnomonic map surface.

The electrical conductors or lead wires from the potentiometer 44 are not shown in Fig. 2 but they are flexible and extend upwardly and into the hollow bore 56 of spindle 60 and are fastened to the respective slip rings 57, 58 and 59 which are insulated from each other and mounted on the upper end of the bell-shaped housing spindle 60, above the bearings 36.

An annular housing 61 is fixed on, and above, the tiltable support 34 having inspection windows 62, and a cap 63 is fitted thereon having an electrical conduit opening 64 to receive a flexible conduit 65 having the leads or conduits 65a, etc. which extend to a suitable calibrated electrical device 65e for computing the electrical output of the potentiometer in terms of the adjusted angular relation of the axis 51 relative to the axis 35. The ends of the leads 65a extending within the cap 63 are, of course, connected to suitably relatively insulated separate brushes in contact respectively with slip rings 57, 58 and 59.

The plotting board and pantograph also includes a means for locating an unknown transmitter on the gnomonic map (such as a radio transmitter) from bearings furnished by at least two (or more) direction finder stations of a network the positions of which are located on the map. To initially locate the unknown transmitter on the gnomonic map, with respect to the finder stations, from a desired pointed or the "plotting central" 19 aforesaid on the map, for the purpose of determining true distance or range from the "plotting central" on the map to the unknown transmitter, as specifically set forth above, the means for initially locating the unknown station on the gnomonic map preferably comprises a pantograph extension or arms connected to the two arms 7 and 8 so as to move therewith and reproduce the position of the scanning point 10 below the map supporting surface of the table 1. (See Fig. 5.)

"Locator stations" are also initially located and fixed under the table with respect to the locations of these station locations on the gnomonic map, directly under the said locations on the map A or on a smaller relative scale. Bearing, actuator rods extend outwardly from the reproduced locator stations (under the table) and are swingable about the center or vertical axis of the locator stations, parallel to the map supporting surface of table 1. The outer end of the second scanning arm (below the table) is swivelly and slidably connected to the swingable arms below the table aforesaid so that when the scanning point 10 is shifted the arms are either shifted about the simulated locator station pivots, or slide in the swivel connection. Swinging of each station locator arm correspondingly rotatably adjusts a shaft which is connected to a potentiometer through a universal joint interposed between the ends of the shaft and the angular adjustment at opposite sides of the universal (in a plane parallel to the table top) corresponds to the angle between the point of tangency on the gnomonic map and the position of the locator station on the map. Since this angle is a "range" angle from the point of tangency it can easily be determined. This is done by scribing an arc on the map from the position of the locator station to the meridian through the point of tangency. This angle is the difference in latitude between the point of tangency and the point of intersection of the arc and the said meridian.

It has been determined that the relation between the plane angle on a gnomonic map and the spherical or true angle at any point on the earth's surface correspond to the angular displacement of one shaft of a universal joint, away from the axis of the other shaft, when the angular relation aforesaid of the shafts is properly oriented so as to be equal to the angular displacement from the point of tangency of the gnomonic map to the location of the said point. With this angular setting as aforesaid, when the station locator arms are swung by the lower pantograph reproducing arm, true angles are generated by the output shaft of the universal joint and these are measured by means of the potentiometers.

The potentiometers corresponding to the location stations, not shown, are provided with a differential input by means of which the differences or deviations between the correlated angles generated by the locator arms and the reported azimuth angles or bearings and can be determined. These deviations are measured by means of the potentiometers and are then arranged in a suitable electric circuit. The above-mentioned selected point, the most probable location of the transmitter is determined by a scanning process involving these features of the plotting board.

The azimuth or bearing with respect to true north of the selected point can be then determined by means of a computer somewhat similar to the locator stations but without a different input to the potentiometer thereof.

The structure for determining the azimuth angle or bearing of the selected point is schematically illustrated in Fig. 5, the parts of the pantograph and plotting board for determining bearing that are illustrated thereon being referred to by reference characters.

The arms of links 7, 11, 8—8a and 9 are shown in Fig. 1, however the range computer assembly and connections are omitted from Fig. 5. The arms 7 and 8 are formed with rigid downwardly extending bracket extensions 100 and 101 which extend below the map supporting table A at 100a and 101a in parallel relation to the arms 7 and 8, and a second reproducing pantograph arm 103 is connected thereto at points 104 and 105. In actual practice the lengths of the arms 100a, and 101a and 103 is one half that of arms 7, 8 and 9 so that the ratio of movement of the reproduced scanning point 106 to the upper scanning point 10 is 1:2. This reduction is for convenience like the lower ratio of movement of the reproduced scanning point 16 to that of the map scanning point 10. At the scanning point 106 of lower pantograph arm 103 are two (or more) swivel guide bearings 107.

A housing is adjustably positioned under the table to locate a vertical shaft 108 under the table 1, with its axes located perpendicular to the map surface, in a position corresponding with a previously located transmitter locator station 113 on the gnomonic map as explained above. Where the ratio of scanning point 106 is half that of scanning point 10 this would be in relation to an imaginary gnomic half size map (not shown). The lower end of shaft 108 carries gear means 109 which correspondingly adjusts a second shaft 110 having a universal joint 111 therein, the outer end portion 112 of the shaft 110 being mounted in suitable bearing means for adjustment of the angle of the axis of portion 112 from the axis 110a (of shaft portion) carrying the bevel gear means 109. This angular adjustment is in a horizontal plane parallel to plane of the map (for convenience) and is made such that the angle between the point of tangency 3 and the selected transmitted locator station position 113 equals the angle between the axis 110a of the shaft 110 and the axis of the shaft portion 112. An index pin 114 is provided in the adjustable supporting housing for the universal joint 111 in order to "zero" index the universal joint to provide the proper orientation of the correction produced by the universal joint (a clamp is provided on the lower gear means 109) a further clamp is provided on the potentiometer shaft for orienting the potentiometer 115 to corresepond to true north.

When the respective universal joint shaft connections are adjusted angularly, as indicated above, the scanning point 10 can then be moved on the gnomonic map surface to the said selected point and the output of the potentiometer 115 connected to meters which indicate the bearings of the selected point or transmitter station location. "Range" between the unknown station and the plotting central can then be accurately determined as before and is the subject matter of this invention.

*Operation range*

Assuming that some unknown range on the gnomonic may A is to be determined, from a known point or "plotting central" 19 to a second point for instance where the scanning point 10 of the pantograph scanning arm is positioned as in Fig. 1. The scanning point 10 may be shifted to the "plotting central" location 19 and this movement displaces the reproducing end 8a of the pantograph arm 8, and the axis 51 of the tubular sector arm 38 is displaced relative to the axis 35 of the housing 34, the range signal potentiometer 44 creates a voltage proportional to the angular displacement aforesaid of the shaft axis 51 from the axis 35 of the range computer assembly. To dispose the direction of the axis 35 in alignment with the plotting central 19a on the imaginary map Aa and the center of the imaginary sphere 18 as shown in Fig. 1 by the line 119, the securing means 29 and 32 (Fig. 2) for the main housing 34 is loosened slightly and the housing 34 is tilted, and turned if necessary, to dispose the axes 35 and 51 in alignment. This adjusts the range potentiometer 44 to "zero" output voltage at the position of the plotting central. This alignment can accurately be determined by rotating the bell housing 37 on its supporting bearings 36 and adjusting the housing axis 35 to obtain zero range electrical output throughout said rotative adjustment about the axis of plotting central position.

After the main housing of the range computer is secured in its adjusted position the scanning point 10 of the scanning arm 9 is moved to the selected or indicated point on the gnomonic map A representing the unknown transmitter and this adjusts the position of the pantograph reproducing point 16 to a corresponding position on the smaller imaginary map A$a$, the shaft or rod portion 55 secured in the arm 8$a$ at 16, through universal 54, shifting the tubular sector arm 38, which shifts and inclines the portion 53 of the shaft 55 above the universal 54. This establishes an imaginary range angle, such as 20 between the plotting central and the selected unknown range point on the gnomonic map A and this range angle is duplicated in the range computer at 20$a$, the movement or inclination of the tubular sector arm 38 shifts the rack 42 to correspondingly adjust the range potentiometer to provide an electrical potential output from the potentiometer proportional to the indicated or adjusted range angle, and the corrected electrically responsive indicator connected to the potentiometer, and calibrated in range angles, and if desired, calibrated in nautical miles and will indicate the range angle or distance between a predetermined plotting central (located at any point on the gnomonic map A) and any other selected point on the gnomonic map.

While the invention has been described in connection with one specific embodiment, somewhat schematically illustrated, the principles involved as shown and described are susceptible of modification and slight changes. Therefore the invention is to be limited only as indicated by the scope of the appended claims.

I claim:

1. A range computing apparatus for computing range on a gnomonic may comprising a supporting means having a plane map supporting surface for mounting a gnomonic map thereon, a pantograph mounted on the supporting means and having a scanning point movable over the supporting surface to any selected point on the gnomonic map mounted thereon, said pantograph having a reproducing end movable proportional to movements of the scanning point over the gnomonic map to trace an imaginary gnomonic map in a space proportional to the gnomonic map on the supporting surface, a range computer assembly support fixed relative to the pantograph supporting means and the map supporting surface, an adjustable range computer housing adjustably fixed to the assembly support, and having a central axis, said housing being adjustable to dispose said central axis at any predetermined angular relation to a line from the point of tangency of the gnomonic map to the center of the imaginary gnomonic map producing globe or sphere for the gnomonic map on the supporting surface, said computer housing including computer means carried thereby comprising a first range computer assembly part rotatably mounted in the computer housing and rotated on an axis coincident with the computer housing axis, a second cooperating movable range computer part pivotally connected to the first range computer assembly part having an axis angularly tiltable relative to the axis of the first range computer part in a plane coincident with the first range computer assembly part axis to conform with any line from any selected point on the gnomonic may to the center of the said imaginary gnomonic map reproducing sphere or globe, a universal actuating connection between the reproducing end on the pantograph and the second movable range computer part for tilting the same proportional to movement of the scanning end over the gnomonic map, and angle measuring means connected between the first range computer assembly part and second range assembly part for measuring the angular relation between the axes of said first range computer assembly part and the second movable range computer part whereby the range angle between any two selective points on the gnomonic map can be reproduced by the positions of the axes of the said first range computer assembly part and said second movable range computer part, and the said reproduced range angle measured to indicate the range angle between the corresponding points on the gnomonic map and converted to nautical distance.

2. A range computing apparatus for computing range on a gnomonic map comprising a supporting means having a plane map supporting surface for mounting a gnomonic map thereon, a pantograph mounted on the supporting means and having a scanning point movable over the supporting surface to any selected point on the gnomonic map mounted thereon, said pantograph having a reproducing point movable proportional to movement of the scanning point over the gnomonic map to trace an imaginary gnomonic map in space proportional to the gnomonic map on the supporting surface, a range computer assembly support fixed relative to the pantograph supporting means and the map supporting surface, a range computer housing adjustably fixed to the assembly support having a central axis adjustable to any predetermined angular relation to a line from the point of tangency of the gnomonic map to the center of the imaginary gnomonic map producing globe or sphere for the gnomonic map on the supporting surface, said computor housing including computer means comprising a first part rotatably mounted in the computer housing on an axis conicident with the computer housing axis, a second cooperating movable part pivotally connected to the first part having an axis angularly tiltable relative to the axis of the first part in a plane coincident with the first part axis to conform with any line from any selected point on the gnomonic map to the center of the said imaginary gnomonic map reproducing sphere or globe, a univeral actuating connection between the reproducing point on the pantograph and the second part for tilting the same proportional to movement of the scanning point over the gnomonic map, and angle measuring means connected between the first and second parts for measuring the angular relation between the axis of said first and second parts whereby the range angle between any two selective points on the gnomonic map can be reproduced in space by the relation of the axes of the said first and second parts, and the said reproduced range angle measured to indicate the range angle between the corresponding points on the gnomonic map and converted to nautical distance, in which said range angle measuring means includes potentiometer means carried by one of said first and second parts having a substantially linear electrical output, and potentiometer setting means on the said other of said first and second parts for actuating the potentiometer proportional to the angular displacement of the said axis of the second part relative to the axis of the said first part, and range angle indicating means connected to the electrical output of said potentiometer, for converting the electrical potential output of said potentiometer into degree of angular displacement of said axes to indicate the angular displacement of the said axes of the said first and second parts to indicate the angular range distance on the gnomonic chart between any two selected points thereon.

3. In a range computer apparatus for computing range angle distance on gnomonic maps, a plotting board having a map supporting surface for receiving a gnomonic may thereon, a pantograph mounted adjacent the map supporting surface having a scanning point movable over the map supporting surface to any selected or indicated points on a gnomonic map thereon, said pantograph having a reproducing end correspondingly movable in spaced relation to the supporting surface to describe an imaginary gnomonic map proportional to the physical gnomonic map on the supporting surface, and range computing means connected to the reproducing end of the pantograph for physically reproducing the angular relation between any two reproduced points on the gnomonic map and the center of an imaginary globe corresponding to the gnomonic map globe for the gnomonic map at point of tangency, and electrically operated means connected to said range computing means for measuring said reproduced angular relation, to indicate the range angle incident thereto.

4. A range computing device for gnomonic maps, comprising a plane support for mounting a gnomonic map thereon, a pantograph device having a scanning point movable over the plane support to reach any point on a gnomonic map when mounted on the plane support, said pantograph having a reproducing arm with a reproducing end extending beyond the edge of the plane support and having a reproducing point to reproduce the movements of the scanning point over the gnomonic map at one side of the plane support, a computer support fixed at one side of the plane support adjacent the said pantograph reproducing end, a first range computer part having a central axis, and rotatable thereabout and universally tiltable on the computer support to dispose said axis in parallel relation to any line from any point on a gnomonic map on the plane support to the center of the imaginary map producing sphere for the said gnomonic map, a second range computer part pivoted on said first range computer part about an axis intersecting said first range computer part axis for swinging and rotative movement on said first range computer part axis and having a range angle determining axis inclinable by swinging and rotative adjustment of said second range computer part about its pivot and rotative on the first range computer part to dispose said range angle determining axis paarallel to any second line from any other point on the gnomonic map to the center of its map producing sphere, clamp means for securing the first range computer part on the computer support in its adjusted position, and positive actuating means connected between the reproducing end of the pantograph and the second range computer part for adjusting the range angle determining axis of the second range computer part about its pivot relative to the central axis of the first range computer part in accordance with the movement of the reproducing end of the pantograph, and range angle determining means connected between said first range computer part and second range computer part for determining the relative angular relation between said central axis and said range angle determining axis of the first range computer part and second range computer part to measure the range angle between said central axis and said range angle determining axis thereof.

5. Apparatus as claimed in claim 4, in which the range angle determining means comprises a potentiometer having a linear electrical output, carried by either said first or said second range computer parts, and means carried by the other range computer part for adjusting the potentiometer proportional to the relative angular relation between the said central axis and said range angle determining axis said first and second range computer parts, and electrical range angle indicating means connected to the potentiometer for determining the angular relation between the central axis and said range angle determining axis of the said first and second range computer parts and converting the same to range angle, as indicated between the said any two selected points on the gnomonic map.

6. Apparatus as claimed in claim 5 in which the first range computer part is journalled for free rotation on said central axis and the second range computer part is pivoted to the first computer part by means on an axis perpendicular to and passing through the first range computer part central axis to swing in a plane including the first range computer part central axis said second range computer part having a guide bore therein concentric to the said second range computer part axis, a pair of shafts universally connected together intermediate their ends, one shaft being guidingly received in said bore, said other shaft being fixedly connected to the reproducing arm of said pantograph in concentric relation to said reproducing point and perpendicular to the direction of movement of the reproducing point as the scanning point is moved over the surface of the gnomonic map.

7. Apparatus as claimed in claim 6 in which the potentiometer is of the linear output type and is fixed on first range computer part, and includes a pinion gear for actuating its slider element and the second range computer part includes a gear rack segment fixed thereto in meshing relation with the pinion.

No references cited.